(12) United States Patent
Kamiyama et al.

(10) Patent No.: US 10,474,253 B2
(45) Date of Patent: Nov. 12, 2019

(54) ELECTRONIC PEN INCLUDING A PRESSING MEMBER HAVING AN EXTENSION THAT EXTENDS ALONG AN OUTER WALL OF A WRITING-PRESSURE DETECTOR

(71) Applicant: Wacom Co., Ltd., Saitama (JP)

(72) Inventors: Ryoji Kamiyama, Ibaraki (JP); Mamoru Ogata, Tokyo (JP); Osamu Nagase, Kanagawa (JP)

(73) Assignee: WACOM CO., LTD., Saitama (JP)

( * ) Notice: Subject to any disclaimer, the term of this patent is extended or adjusted under 35 U.S.C. 154(b) by 120 days.

(21) Appl. No.: 15/711,801

(22) Filed: Sep. 21, 2017

(65) Prior Publication Data

US 2018/0011560 A1    Jan. 11, 2018

Related U.S. Application Data

(63) Continuation of application No. PCT/JP2016/061862, filed on Apr. 13, 2016.

(30) Foreign Application Priority Data

Apr. 17, 2015  (JP) ................................ 2015-084607

(51) Int. Cl.
*G06F 3/03* (2006.01)
*G06F 3/0354* (2013.01)
*G06F 3/038* (2013.01)

(52) U.S. Cl.
CPC ........ *G06F 3/03545* (2013.01); *G06F 3/0383* (2013.01); *G06F 2203/04105* (2013.01)

(58) Field of Classification Search
CPC .................................. G06F 3/03; G06F 3/038
See application file for complete search history.

(56) References Cited

U.S. PATENT DOCUMENTS 5,056,947 A * 10/1991 Kubota ................ B43K 24/146
                                                              401/29
5,633,471 A    5/1997 Fukushima
(Continued)

FOREIGN PATENT DOCUMENTS

EP     0 772 149 A1    5/1997
EP     2 624 104 A2    8/2013
(Continued)

*Primary Examiner* — Pegeman Karimi
(74) *Attorney, Agent, or Firm* — Seed IP Law Group LLP

(57) ABSTRACT

An electronic pen indicates a position to a position detection module by transmitting and receiving signals with the position detection module. A cylindrical casing, a core member, a writing-pressure detector, and a writing-pressure transmission member are accommodated in a interior portion of a cylindrical casing. A pressing member applies, based on a user operation, a displacement force to the core member from a first end, which is opposite to a second end serving a pen tip, to the second end serving as the pen tip. The writing-pressure transmission member includes a protrusion which, in operation, transmits a writing pressure, which has been exerted on the core member fitted in a fit-in portion included in the writing-pressure transmission member, to the writing-pressure detector. The pressing member is configured to apply a displacement force to the core member via the writing-pressure transmission member without applying an axial force to the writing-pressure detector.

18 Claims, 6 Drawing Sheets

(56) References Cited

U.S. PATENT DOCUMENTS

| | | | |
|---|---|---|---|
| 8,913,041 B2 | 12/2014 | Fukushima et al. | |
| 2014/0085270 A1* | 3/2014 | Obata | G06F 3/03545 345/179 |
| 2014/0132529 A1* | 5/2014 | Jeong | G06F 3/044 345/173 |
| 2016/0154486 A1* | 6/2016 | Ogata | G06F 3/0383 345/179 |
| 2016/0282970 A1* | 9/2016 | Evreinov | G06F 3/03545 |
| 2017/0090605 A1* | 3/2017 | Horie | G06F 3/046 |
| 2017/0102792 A1* | 4/2017 | Aoki | G06F 3/044 |
| 2017/0361639 A1* | 12/2017 | Kaneda | B43K 27/006 |

FOREIGN PATENT DOCUMENTS

| | | |
|---|---|---|
| JP | 8-194574 A | 7/1996 |
| JP | 9-128131 A | 5/1997 |
| JP | 2007-219723 A | 8/2007 |
| JP | 2011-186803 A | 9/2011 |
| JP | 2012-256088 A | 12/2012 |
| JP | 5687398 B1 | 3/2015 |
| WO | 2015/019883 A1 | 2/2015 |

\* cited by examiner

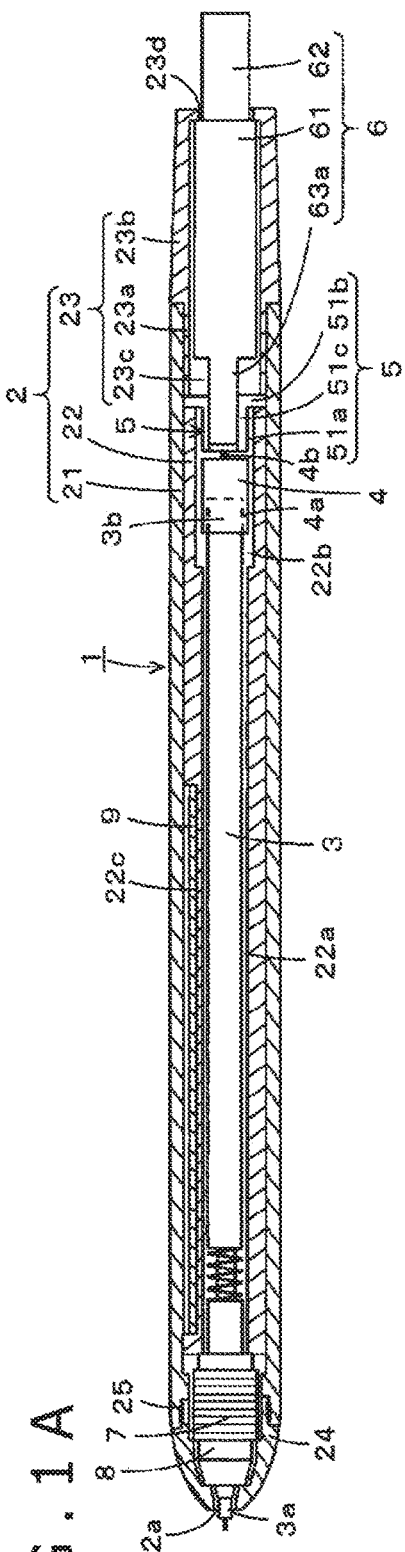
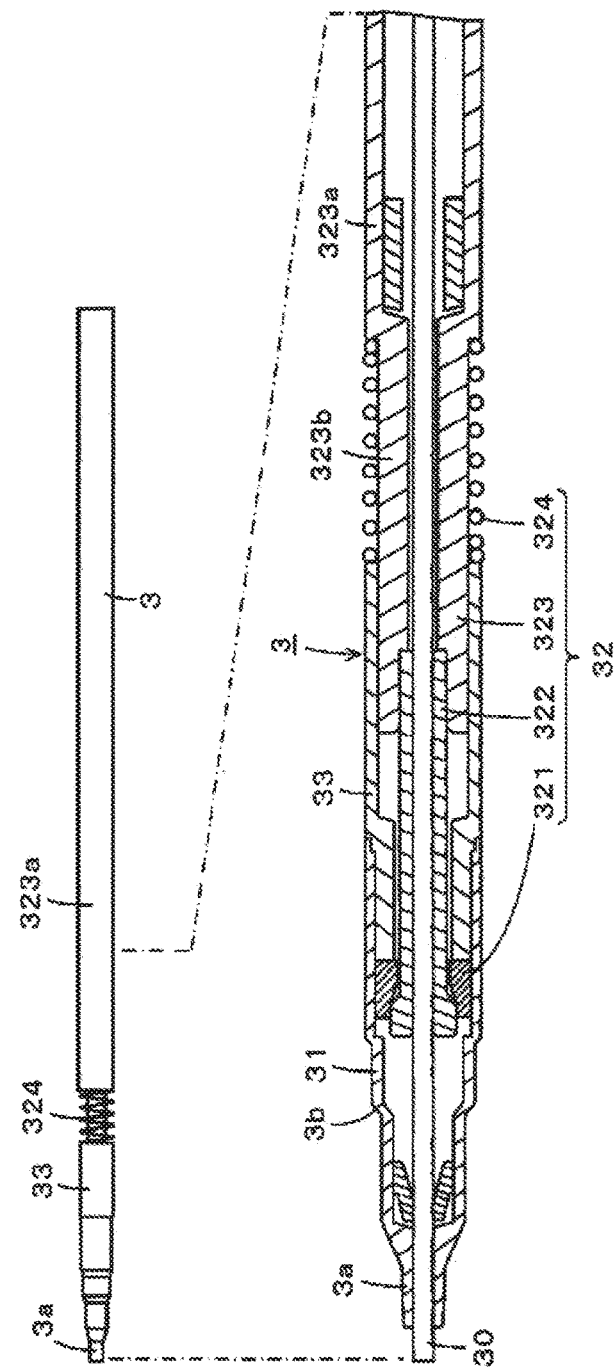
FIG. 1A
FIG. 1B
FIG. 1C

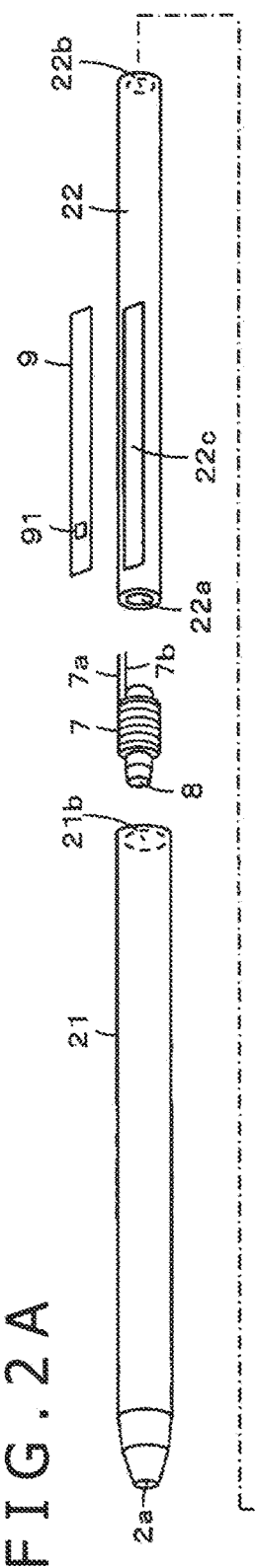
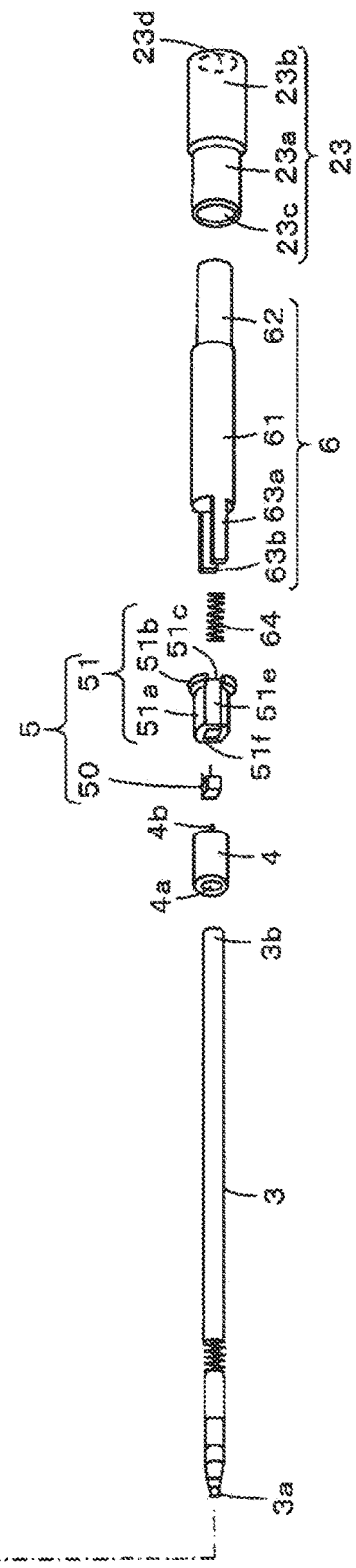
FIG. 2A
FIG. 2B

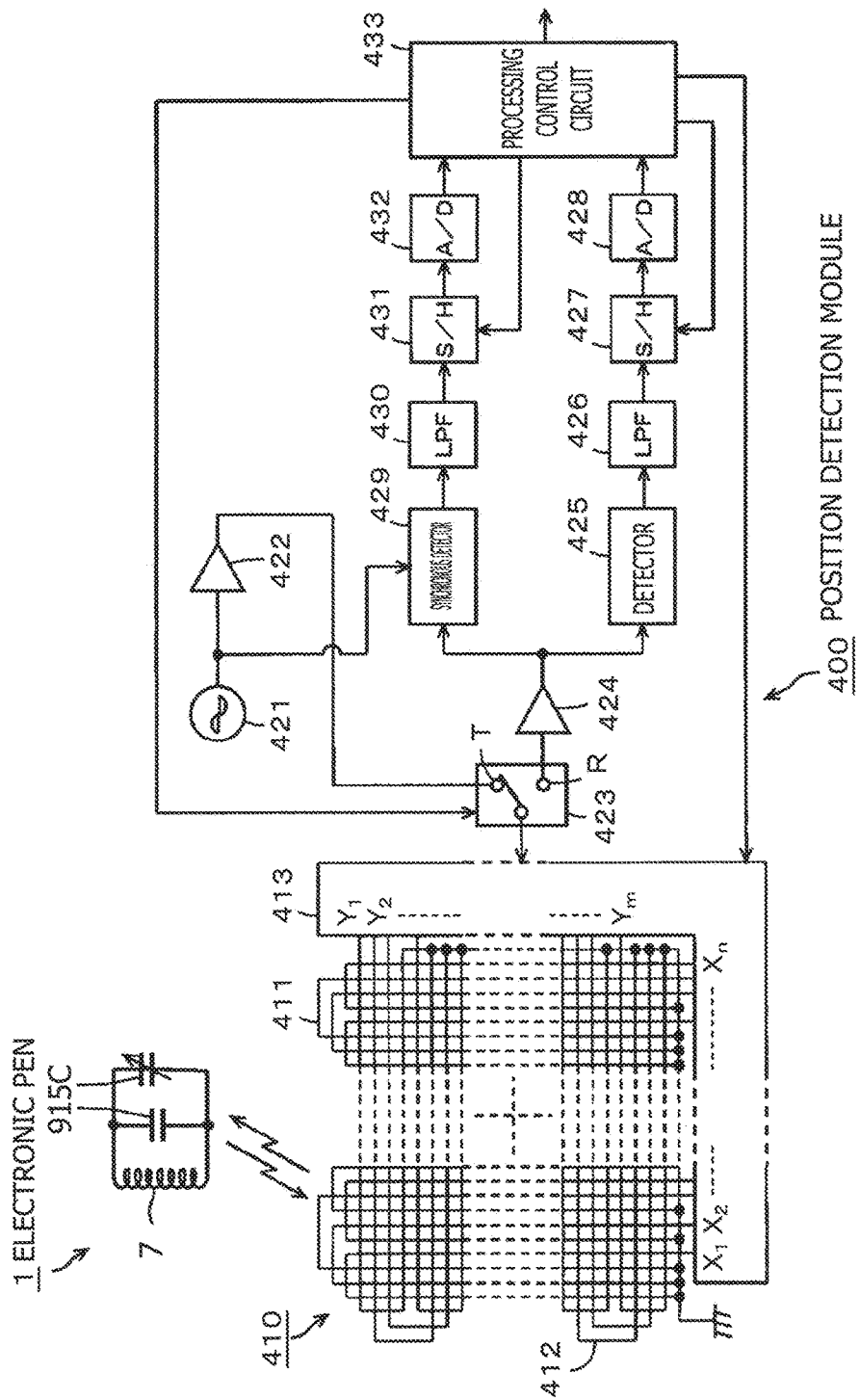

ELECTRONIC PEN INCLUDING A PRESSING MEMBER HAVING AN EXTENSION THAT EXTENDS ALONG AN OUTER WALL OF A WRITING-PRESSURE DETECTOR

BACKGROUND

Technical Field

The present disclosure relates to an electronic pen having a writing-pressure detection function.

Background Art

In recent years, electronic pens with a ballpoint pen refill or a mechanical pencil refill used as a core member have been proposed as disclosed, for example, in Patent Document 1 (Japanese Patent Laid-open No. 2007-219723) and Patent Document 2 (Japanese Patent Laid-open No. 2012-256088). An electronic pen of this type has a merit that, by performing writing or drawing (hereinafter referred simply to as "writing") with the ballpoint pen or the mechanical pencil on a sheet of paper placed over a position detection sensor of a position detection module used in combination with the electronic pen, handwriting can be left on the sheet of paper and the handwriting can also be left as electronic information by recognizing it with the position detection sensors.

In general, an electronic pen is provided with a writing-pressure detector for detecting a pressure (writing pressure) exerted on a side of an end, as a pen tip portion, of a core member, and to a position detection module, the writing-pressure detector transmits information on the detected writing pressure together with position detecting signals or wirelessly transmits it separately from the position detecting signals. In such an electronic pen with a ballpoint pen refill or a mechanical pencil refill used as a core member as described above, a writing-pressure detector is also provided to transmit information on a writing pressure to a position detection module.

PRIOR ART DOCUMENTS

Patent Documents

Patent Document 1: Japanese Patent Laid-open No. 2007-219723

Patent Document 2: Japanese Patent Laid-open No. 2012-256088

BRIEF SUMMARY

Technical Problem

A writing-pressure detector is disposed on a first end of a core member, the first end being opposite to a second end of the core member serving a pen tip in the direction of an axis of a hollow section of a casing of an electronic pen, and is configured to detect a pressure exerted on the second end of the core member serving as the pen tip. In the above-described electronic pen with a ballpoint pen refill or a mechanical pencil refill used as the core member, a mechanism for detecting a writing pressure is configured similarly.

Incidentally, knock-type ballpoint pens are well known. They keep a ballpoint pen refill within a casing while not in use but cause it to extend out on a side of a pen tip of the ballpoint pen from an opening of the casing by a knocking mechanism upon use. In addition, knock-type mechanical pencils are also well known. They include a feeding mechanism for a core such as graphite, which is operated by knocking. Such a knocking mechanism is disposed on a side opposite to a side of a pen tip. In the case of an electronic pen provided with a writing-pressure detector, a knocking mechanism, therefore, has a configuration that a pressure is applied to a feeding mechanism of a ballpoint pen or mechanical pencil via the writing-pressure detector.

An electronic pen, which is provided with the mechanism of a knock-type ballpoint pen or the mechanism of a mechanical pencil that a core such as graphite is fed by knocking, is hence brought into a state that a writing-pressure detector is subject not only to a pressure from a side of a core member but also to another pressure from a side opposite to the side of the core member according to a knocking operation. In general, the pressure upon the knocking operation is significantly greater compared with the writing pressure exerted on the pen tip when a position is pointed and inputted using the electronic pen. Accordingly, the writing-pressure detector has increasing occasions that a pressure is applied, and also has many occasions that a pressure greater than that exerted on the core member is applied.

As described above, in an electronic pen provided with a writing-pressure detection function, the frequency of application of a pressure to a writing-pressure detector is greater, in such a case as a knock-type ballpoint pen or knock-type mechanical pencil, compared with the case of detecting only a pressure (writing pressure) to a pen tip, and moreover a pressure greater than the writing pressure exerted on the pen tip may be applied to the writing-pressure detector, and hence there is a problem that deterioration of the writing-pressuredetector may be accelerated correspondingly.

With the foregoing in view, it is an object of the present disclosure to achieve a reduction of the deterioration of a writing-pressure detector in an electronic pen provided with the writing-pressure detector.

Technical Solution

To solve the above-described problem, the present disclosure provides an electronic pen that indicates a position to a position detection module by transmitting and receiving signals with the position detection module, the electronic pen including: a cylindrical casing; a core member accommodated in a hollow section of the casing; a writing-pressure detector disposed in the hollow section of the casing on a first end of the core member, the first end being opposite to a second end of the core member serving as a pen tip; a writing-pressure transmission member disposed in the hollow section of the casing, between the second end opposite to the first end of the core member serving as the pen tip and the writing-pressure detector; and a pressing member configured to apply, based on an operation by a user, a force to the core member from the second end, the second end being opposite to the first end serving as the side of the pen tip, to the first end serving as the pen tip, wherein the writing-pressure transmission member includes a protrusion which, in operation, transmits a writing pressure, which has been exerted on the core member fitted in a fit-in portion included in the writing-pressure transmission member, to the writing-pressure detector, and the pressing member is configured to apply the force to the core member via the writing-pressure transmission member without applying an axial force to the writing-pressure detector.

In the electronic pen of the above-described configuration according to the present disclosure, the first end of the core member, which is opposite to the second end of the core member serving as the pen tip, is connected to the writing-pressure detector via the writing-pressure transmission member. A force, which has been applied, based on a pressing operation by a user on the pressing member, toward the first end of the core member, which is opposite to the second end of the core member serving as the pen tip, is applied to the core member through the writing-pressure transmission member without being applied to the writing-pressure detector. Hence, forces toward the second end of the core member serving as the pen tip from the first end of the core member, which is opposite to the second end of the core member serving as the pen tip are no longer applied to the writing-pressure detector, so that the deterioration of the writing-pressure detector by such forces can be prevented.

Advantageous Effect

According to the electronic pen of the present disclosure, pressures are exerted on the writing-pressure detector only from the second end of the core member serving as the pen tip, and no pressure is exerted on the writing-pressure detector from the first end of the core member, which is opposite to the second end of the core member serving as the pen tip. Therefore, the deterioration of the writing-pressure detector can be reduced.

BRIEF DESCRIPTION OF THE DRAWINGS

FIGS. 1A, 1B, 1C depict views for describing an example of a configuration of a first embodiment of the electronic pen according to the present disclosure.

FIGS. 2 A and 2B depict an exploded perspective view and a partly-enlarged view for describing the example of the configuration of the first embodiment of the electronic pen according to the present disclosure.

FIG. 4 is a view for describing an example of a circuit configuration of a position detection module for use in combination with the first embodiment of the electronic pen according to the present disclosure.

MODES FOR CARRYING OUT THE DISCLOSURE

Figure 3A:
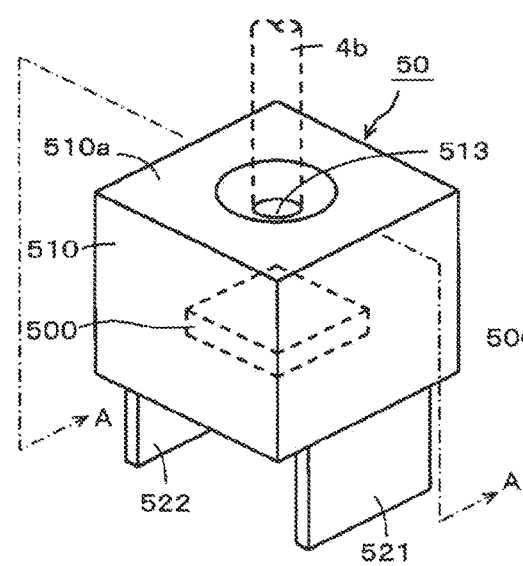
FIGS. 3A and 3B depict views for describing an example of parts of a writing-pressure detector used in the first embodiment of the electronic pen according to the present disclosure.

Embodiments of the electronic pen according to the present disclosure will hereinafter be described with reference to the drawings.

[First Embodiment]

FIGS. 1A, 1B, 1C depict views illustrating an example of a configuration of a first embodiment of the electronic pen according to the present disclosure. An electronic pen 1 of this first embodiment is designed to have the configuration of a position indicator of an electromagnetic induction type. FIG. 1A illustrates the overall configuration of the electronic pen 1 of the first embodiment, and is a view illustrating it with a part of a pen-shaped casing 2 to describe internal components.

In the electronic pen 1 of this first embodiment, as illustrated in FIG. 1A, a mechanical pencil refill 3 as an example of the core member, a writing-pressure transmission member 4, a writing-pressure detector 5 and a pressing member 6 are disposed in a cylindrical casing 2 such that they align side by side in the direction of an axis of the casing 2. These internal components are disposed such that a pen tip 3a of the mechanical pencil refill 3 can extend out from an opening 2a, as a side of a pen tip, of the casing 2.

FIG. 1B illustrates an example of the mechanical pencil refill 3, and FIG. 1C is an enlarged view of a feeding mechanism for a core such as, for example, a graphite core of the mechanical pencil refill 3. With regard to this feeding mechanism for the mechanical pencil refill 3, a description will be made later in detail.

In the electronic pen 1 of the first embodiment, as illustrated in FIG. 1A, a magnetic alloy core with a coil 7 wound thereon, in this example, a ferrite core 8 is provided in a vicinity of the opening 2a in the casing 2. As will be described later, the ferrite core 8 is axially provided with a through-hole, and is configured such that the mechanical pencil refill 3 as the core member extends, at the side of the pen tip 3a thereof, in and out of the through-hole of the ferrite core 8.

FIG. 2A is an exploded perspective view of the electronic pen 1 of the first embodiment. On the other hand, FIG. 2B is an enlarged cross-sectional view of the ferrite core 8 with the coil 7 wound thereon, and illustrates a state that the side of the pen tip 3a of the mechanical pencil refill 3 extends through and extends out from the ferrite core 8 (the mechanical pencil refill 3 is not illustrated in cross-section).

As illustrated in FIGS. 1A, 1B, 1C and FIG. 2A, the casing 2 is formed of a cylindrical outer casing 21, a cylindrical inner casing 22, a cylindrical cap section 23, and a pen tip sleeve 24. The casing 2 is provided with a configuration that the side of an axial end of the outer casing 21 is designed as a pen tip side of the electronic pen 1 of this embodiment, and that as illustrated in FIG. 1A, the pen tip sleeve 24 is in threaded engagement with a pen tip side of the outer casing 21 at threaded portions 25. The opening 2a of the casing 2 is formed as an opening of the pen tip sleeve 24.

The ferrite core 8 with the coil 7 wound thereon is accommodated as close to the opening 2a as possible in a hollow part defined by the pen tip sleeve 24 and the pen tip side of the outer casing 21. Now, as illustrated in FIG. 1A, the ferrite core 8 has an outer diameter chosen to be greater than the diameter of the opening 2a, and therefore the ferrite core 8 is configured to avoid falling off outwardly from the pen-tip-side opening 2a of the outer casing 21.

The inner casing 22 has an outer diameter set to be slightly smaller than the diameter of a hollow section of the outer casing 21, and as illustrated in FIG. 1A, the inner casing 22 is accommodated in the hollow section of the outer casing 21. As illustrated in FIG. 1A, the inner casing 22, on the other hand, has a hollow section the diameter of which is chosen to have a value greater than the maximum outer diameter of the mechanical pencil refill 3, so that the mechanical pencil refill 3 is freely movable through the hollow section of the inner casing 22.

The hollow section of the inner casing 22 on the side of the opening 2a has a value chosen to be smaller than the outer diameter of the ferrite core 8. Consequently, if the inner casing 22 is placed in the outer casing 21 after the ferrite core 8 with the coil 7 wounded thereon has been accommodated in the pen tip sleeve 24 and the pen-tip-side hollow section of outer casing 21, a pen-tip-side end portion of the inner casing 22 comes into contact with an end face of the ferrite core 8, whereby the ferrite core 8 is brought into a state that it is fixed in position on the side of the pen tip in the follow section of the casing 2, as depicted in FIG. 1A.

In this embodiment, the inner casing 22 is cut off at a part of an outer circumferential wall thereof along the axial direction so that a planar part 22c is formed. In this embodiment, the planar part 22c is formed on the inner casing 22 at a position closer to the side of the ferrite core 8 on which the coil 7 is wound. On this planar part 22c, a printed circuit board 9 is disposed as illustrated in FIG. 1A and FIG. 2A.

Disposed on the printed circuit board 9 is a capacitor 91, which in this embodiment, is connected in parallel with the coil 7 to make up a resonant circuit. The coil 7 wound on the ferrite core 8 is electrically connected at one end 7a and the other end 7b thereof to the printed circuit board 9 by soldering or the like, and therefore is connected in parallel with the capacitor 91 to form a resonant circuit.

As illustrated in FIG. 1A, the mechanical pencil refill 3 extends through the hollow section of the inner casing 22 and extends further through a through-hole 8a (see FIG. 2B) of the ferrite core 8, whereby the mechanical pencil refill 3 is accommodated in the casing 2 with the pen tip 3a extending outwardly from the opening 2a of the casing 2.

As illustrated in FIG. 2B, the ferrite core 8 in this embodiment is formed in such a shape that a tapered portion 8b is formed with a progressively decreasing diameter toward the opening 2a and magnetic flux concentrates more on the side of the opening 2a of the ferrite core 8.

As illustrated in FIG. 2B, the through-hole 8a of the ferrite core 8 in this embodiment is not uniform in diameter, and on the side of the opening 2a, is formed as a small-diameter hole portion 8c smaller than the remaining position. As illustrated in FIG. 2B, the mechanical pencil refill 3 is provided with a stepped portion 3c between the pen tip 3a and the remaining part. The through-hole 8a of the ferrite core 8 is designed to have a diameter smaller than the diameter of the small-diameter hole portion 8c of the ferrite core 8 on the side of the pen tip 3a with respect to the stepped portion 3c but is designed to have a diameter larger than the diameter of the small-diameter hole portion 8c of the ferrite core 8 on a side opposite to the side of the pen tip 3a with respect to the stepped portion 3c.

Therefore, the pen tip 3a of the mechanical pencil refill 3 extends outwardly from the opening 2a, but the stepped portion 3c is in contact with the small-diameter hole portion 8c of the ferrite core 8 so that the mechanical pencil refill 3 itself is stopped in engagement with the ferrite core 8 and is prevented from moving toward the opening 2a in the axial direction. Consequently, as will be described later, a core 30 such as a graphite core extends out from the pen tip 3a if a force is applied to the mechanical pencil refill 3 from the side opposite to the side of the pen tip 3a such that the core 30 is fed by the feeding mechanism.

The inner casing 22 has a hollow part 22b on a side opposite to the side of the opening 2a. As illustrated in FIG. 1A, the hollow part 22b has an inner diameter set to be slightly greater than the remaining hollow part 22a. In the hollow part 22b of the inner casing 22 on the side opposite to the side of the opening 2a, the writing-pressure transmission member 4 and writing-pressure detector 5 are disposed.

The writing-pressure transmission member 4 has a columnar shape, and has an outer diameter set at a value greater than the inner diameter of the hollow part 22a but smaller than the hollow part 22b of the inner casing 22. Formed in an end face on the side of an axial end portion of the writing-pressure transmission member 4 is a recess 4a, in which an end portion 3b of the mechanical pencil refill 3, the end portion 3b being on a side opposite to the pen tip 3a, is fitted. At a central part of an end face of the writing-pressure transmission member 4, the end face being on a side of an axially opposite end portion, a protrusion 4b is provided to transmit a pressing force to the writing-pressure detector 5. As a result of the fitting of the end portion 3b of the mechanical pencil refill 3, the end portion 3b being on the side opposite to the pen tip 3a, in the recess 4a of the writing-pressure transmission member 4, the end portion 3b of the mechanical pencil refill 3 is closed.

In this embodiment, the writing-pressure detection member 5 is configured of a pressure-sensing component holder 51 and a pressure-sensing component 50 held in the pressure-sensing component holder 51. In this embodiment, the pressure-sensing component 50 is one obtained by sealing a pressure sensor chip 500, which is configured as a semiconductor device fabricated, for example, by a micro electro mechanical systems (MEMS) technology, in a package 510 having, for example, the shape of a cubic or rectangular box.

Figure 3B:
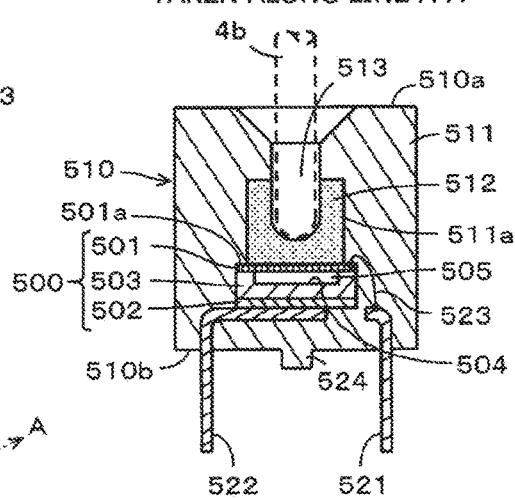

FIGS. 3A and 3B depict views for describing the configuration of the pressure-sensing component in this embodiment, in which FIG. 3A is a perspective view of the pressure-sensing component 50 in this embodiment and FIG. 3B is a longitudinal cross-sectional view taken along line A-A of FIG. 3A.

The pressure sensor chip 500 serves to detect an exerted pressure as a change in capacitance. The pressure sensor chip 500 in this embodiment is formed in the shape of a rectangular parallelepiped of length L, width L and height H, in which L and H are set, for example, at 1.5 mm and 0.5 mm.

The pressure sensor chip 500 in this embodiment includes a first electrode 501, a second electrode 502, and an insulating layer (dielectric layer) 503 between the first electrode 501 and the second electrode 502. The first electrode 501 and second electrode 502 are formed with a conductor composed of single crystal silicon (Si) in this embodiment. The insulating layer 503 is made of an oxide film ($SiO_2$) in this embodiment.

In a surface of the insulating layer 503, the surface facing the first electrode 501, a circular recess 504 is formed centering around a central position of the surface in this embodiment. By this recess 504, a space 505 is formed between the insulating layer 503 and the first electrode 501. In this embodiment, the recess 504 has a bottom wall formed as a planner wall, and has a radius R set, for example, at 1 mm. Further, the recess 504 has a depth set at several tens micrometers to one hundred micrometers or so.

Owing to the existence of this space 505, the first electrode 501 can undergo a displacement to flex toward the space 505 when pressed from the side of a surface 501a which is on a side opposite to the surface that faces the second electrode 502. Single crystal silicon as an example of the first electrode 501 has a thickness set to be flexible by the exerted pressure P and set to be thinner than the second electrode 502.

In the pressure sensor chip 500 of the configuration as described above, a capacitor 5C is formed between the first electrode 501 and the second electrode 502. When the pressure P is exerted on the first electrode 501 from the side of the surface 501a of the first electrode 501, the surface 501a being on a side opposite to the second electrode 502, the first electrode 501 flexes, the distance between the first electrode 501 and the second electrode 502 becomes shorter, and therefore the capacitance of the capacitor 5C changes to a greater value. The amount of flex of the first electrode 501 changes depending on the magnitude of the exerted pressure P. Accordingly, the capacitor 5C functions as a variable capacitance capacitor the capacitance of which depends on the magnitude of the pressure P exerted on the pressure sensor chip 500.

In the pressure-sensing component 50 in this embodiment, the pressure sensor chip 500 having the configuration as described above is accommodated in the package 510 in a state that in FIGS. 3A and 3B, the pressure-receiving surface 501a of the first electrode 501 is parallel with an upper surface 510a of the package 510 and faces the upper surface 510a.

In this embodiment, the package 510 is composed of a package member 511 and an elastic member 512. The package member 511 is made of an electrically insulating material such as a ceramic material or a resin material. The elastic member 512 is disposed on a side of the surface 501a that receives a pressure exerted on the pressure sensor chip 500.

In this embodiment, a recessed portion 511a is formed in an upper part of the package member 511. The upper part is on a side of the surface 501a of the first electrode 501, which receives a pressure exerted on the pressure sensor chip 500. The recessed portion 511a is dimensioned such that it extends over the area of a portion which directly receives a pressure to be exerted on the pressure sensor chip 500. Within the recessed portion 511a, the elastic member 512 which is made, for example, of silicone rubber is filled.

In the package 510, a communication bore 513 is formed communicating from the upper surface 510a to a portion of the elastic member 512. As indicated by a dashed line in FIGS. 3A and 3B, the protrusion 4b provided on the writing-pressure transmission member 4 is inserted in the communication bore 513 such that the protrusion 4b is directed toward the pressure-sensing component 50. Therefore, the pressure P from the outside is exerted in the direction of an axis (in the direction of a center line) of the writing-pressure transmission member 4. It is to be noted that in this embodiment, the communication bore 513 has a diameter set to be slightly smaller than the diameter of the protrusion 4b of the writing-pressure transmission member 4. Therefore, the protrusion 4b of the writing-pressure transmission member 4 has been pushed into the elastic member 512 at an end portion of the communication bore 513. Accordingly, the protrusion 4b of the writing-pressure transmission member 4 is positioned in a state that the axial pressure P is exerted on the side of the pressure-receiving surface of the pressure sensor chip 500 only by being inserted into the communication bore 513 of the pressure-sensing component 50.

As the diameter of the communication bore 513 is slightly smaller than the diameter of the protrusion 4b of the writing-pressure transmission member 4 in this embodiment, the protrusion 4b of the writing-pressure transmission member 4 is brought into a state that it is elastically held by the elastic member 512. In other words, the protrusion 4b of the writing-pressure transmission member 4 is held by the pressure-sensing component 50 when fittingly inserted in the communication bore 513 of the pressure-sensing component 50. However, the protrusion 4b of the writing-pressure transmission member 4 can be easily released from the held state by the pressure-sensing component 50 by drawing it out with a predetermined force.

As illustrated in FIGS. 3A and 3B, a first lead terminal 521 and a second lead terminal 522 are led out from the package member 511 of the pressure-sensing component 50. The first lead terminal 521 is connected to the first electrode 501 of the pressure sensor chip 500, while the second lead terminal 522 is connected to the second electrode 502 of the pressure sensor chip 500. The first lead terminal 521 is electrically connected to the first electrode 501, for example, by a gold wire 523. On the other hand, the second lead terminal 522 is electrically connected to the second electrode 502, because the second lead terminal 522 is led out in a state that it is in contact with the second electrode 502.

The pressure-sensing component 50 is held by the pressure-sensing component holder 51. Described specifically, the pressure-sensing component 50 is accommodated and held in the pressure-sensing component holder 51 such that the upper surface 510a of the package 510 faces the protrusion 4b of the writing-pressure transmission member 4, and the protrusion 4b of the writing-pressure transmission member 4 is fitted in the communication bore 513. It is to be noted that a positioning protuberance 524 is formed on a bottom wall of the package 510 and the protuberance 524 is brought into engagement with a positioning recess (illustration is omitted), which is provided in the pressure-sensing component holder 51, to achieve positioning of the pressure-sensing component 50.

The pressure-sensing component holder 51 is provided with terminals (illustration is omitted), which are connected to the first lead terminal 521 and second lead terminal 522 of the pressure-sensing component 50. These terminals are connected to the printed circuit board 9, and are configured such that the variable capacitance capacitor 5C constituted by the pressure sensor chip 500 is connected in parallel with the coil 7 and capacitor 91.

In this embodiment, the pressure-sensing component holder 51 is provided, as illustrated in FIGS. 1A and 2A, with a main body section 51a, in which the pressure-sensing component 50 is accommodated, and a flange portion 51b. The main body section 51a of the pressure-sensing component holder 51 has a similar outer diameter as the writing-pressure transmission member 4. As illustrated in FIG. 1A, the flange portion 51b is formed with a diameter that is slightly smaller than the diameter of the hollow section of the outer casing 21 but is greater than the diameter of the hollow section of the inner casing 22.

Therefore, when accommodated in the casing 2, the flange portion 51b is in contact with an end portion of the inner casing 22 so that the pressure-sensing component holder 51 is not movable toward the pen tip 3a as illustrated in FIG. 1A.

The cap section 23 has a small-diameter part 23a chosen to be substantially equal to or slightly smaller than the diameter of the hollow section of the outer casing 21 on the side of an opening 21b which is on a side opposite to the side of the opening 2a. The cap section 23 is configured to fit in the outer casing 21 when the small-diameter part 23a is inserted from the side of the opening 21b of the outer casing 21 into the hollow section of the outer casing 21.

The cap section 23 is configured to achieve a state that, when fitted in the outer casing 21, the small-diameter part 23a of the cap section 23 holds and fixes the flange portion 51 of the pressure-sensing component holder 51 of the writing-pressure detector 5 exactly between its end portion and the end portion of the inner casing 22. As illustrated in FIG. 1A, the pressure-sensing component holder 51 is, therefore, configured to be also immovable toward a side opposite to the side of the pen tip 3a when accommodated in the casing 2.

As illustrated in FIG. 2A, the cap section 23 includes the small-diameter part 23a having the outer diameter slightly smaller than the diameter of the hollow section of the outer casing 21, and a large-diameter part 23b having an outer diameter equal to the outer diameter of the outer casing 21. Through the cap section 23, a hollow portion 23c is formed to communicate the small-diameter part 23a and the large-diameter part 23b together. Through an end portion of the large-diameter part 23b, an opening 23d is formed in communication with the hollow portion 23c. The opening 23d has an inner diameter set to be smaller than the diameter of the hollow portion 23c. The large-diameter part 23b is, therefore, configured to have a stepped portion at its end portion.

The pressing member 6 is accommodated in the hollow portion 23c of the cap section 23 with a part thereof extending outwardly from the large-diameter part 23b of the cap section 23. As illustrated in FIGS. 1A and 2A, the pressing member 6 is configured of a cylindrical main body section 61, a cylindrical pressing protrusion 62 integral with the main body section 61, and a pair of pressing arm portion 63a, and 63b axially extending from portions of a circumferential part of the main body section 61, respectively.

The main body section 61 of the pressing member 6 has a diameter set at a value slightly smaller than the diameter of the hollow portion 23c of the cap section 23 but greater than the diameter of the opening 23d in the end portion of the large-diameter part 23b of the cap section 23. On the other hand, the pressing protrusion 62 of the pressing member 6 has a diameter set at a value slightly smaller than the diameter of the opening 23d in the end portion of the large-diameter part 23b of the cap section 23. Therefore, the pressing protrusion 62 extends outwardly from the opening 23d of the cap section 23 and the stepped portion between the main body section 61 and the pressing protrusion 62 is in engagement with the stepped portion of the end portion through which the opening 23d is formed in communication with the hollow portion 23c of the cap section 23, whereby the pressing member 6 is accommodated in the hollow portion 23c without allowing the main body section 61 to extend out from the opening 23d.

As illustrated in FIG. 2A, the pressing arm portions 63a and 63b of the pressing member 6 are disposed such that they are apart from each other by a predetermined distance and face each other with the center point of the main body section 61 being located therebetween. The pressing arm portions 63a and 63b have an axial length chosen at a value greater than the axial length of the writing-pressure detector 5.

As illustrated in FIG. 2A, cut-out portions 51c and 51d (illustration of the cut-out portion 51d is omitted in FIG. 2A) are formed in the flange portion 51b of the pressure-sensing component holder 51 of the writing-pressure detector 5 to allow the pressing arm portions 63a and 63b to extend therethrough, and planar portions 51e and 51f are formed on a side circumferential wall of the pressure-sensing component holder 51 such that they axially continue from the cut-out portions 51c and 51d. The facing distance between the planar portion 51e and the planar portion 51f is set to be slightly smaller than the facing distance between the pressing arm portions 63a and 63b.

Accordingly, the pressing arm portions 63a and 63b of the pressing member 6 are configured to extend to the end portion of the writing-pressure transmission member 4 via the cut-out portions 51c and 51d of the flange portion 51b of the pressure-sensing component holder 51 of the writing-pressure detector 5 and further the areas of the planar portions 51e and 51f and then to come at free ends thereof into contact with the end portion of the writing-pressure transmission member 4. As illustrated in FIG. 2A, a spring 64 is interposed between the pressing member 6 and the writing-pressure detector 5.

As described above, the pressure-sensing component holder 51 of the writing-pressure detector 5 is fixed in axial position at the area of the flange portion 51b thereof by the end portion of the inner casing 22 and the end portion of the small-diameter part 23a of the cap section 23. Therefore, the pressing member 6 is normally kept elastically pressed by the spring 64 toward the opening 23d of the cap section 23. When the pressing protrusion 62 of the pressing member 6 is pressed by a user toward the pen tip against the elastic force of the spring 64, the pressing arm portions 63a and 63b of the pressing member 6 come into contact with the writing-pressure transmission member 4 and act to move the writing-pressure transmission member 4 in the direction toward the pen tip. As a consequence, the function to feed a core such as a graphite core is actuated for the mechanical pencil refill 3 on which the writing-pressure transmission member 4 is fitted.

As the writing-pressure detector 5 is positioned in the space between the pressing arm portions 63a and 63b of the pressing member 6 at this time, a force applied by the pressing member 6 to displace in the direction toward the pen tip is not applied to the writing-pressure detector 5.

When the user stops the pressing to the pressing protrusion 62 of the pressing member 6, the pressing protrusion 62 of the pressing member 6 returns to the initial state under the elastic force of the spring 64. Therefore, by pressing the pressing protrusion 62 once or a few times in a knocking manner, the user can operate the feeding mechanism for the graphite core of the mechanical pencil refill 3 to feed the graphite core of the mechanical pencil refill 3 over a desired length from the pen tip 3a. Here, the force applied by the pressing member 6 to displace in the direction toward the pen tip is not applied to the writing-pressure detector 5.

When a writing pressure is exerted on the side of the pen tip 3a of the mechanical pencil refill 3, the mechanical pencil refill 3 is displaced to the side opposite to the pen tip 3 according to the exerted writing pressure, and this displacement is transmitted to the writing-pressure transmission member 4 fitted on the mechanical pencil refill 3. Consequently, the protrusion 4b of the writing-pressure transmission member 4 presses the pressure sensor chip 500 of the writing-pressure detector 5 according to the exerted writing pressure, so that the capacitance of the variable capacitance capacitor 5C constituted by the pressure sensor chip 500 changes according to the exerted writing pressure. As the variable capacitance capacitor 5C constitutes a part of the resonant circuit in the electronic pen 1 of this embodiment, the information of the writing pressure is transmitted as a change in resonant frequency (phase) to a position detection module.

[Feeding Mechanism for Mechanical Pencil Refill 3]

With reference to the enlarged view of FIG. 1C, a description will next be made with regard to a feeding mechanism for the core of the mechanical pencil refill 3.

The mechanical pencil refill 3 has a configuration that the core of the mechanical pencil, for example, a graphite core 30 is fed by a core feeding mechanism 32 from an opening in the pen tip 3a at a free end portion of a core insertion tube 31. The core insertion tube 31 is fitted on a core accommodation tube 33. The core feeding mechanism 32 is configured of a chuck ring 321 provided on a forward end of the core accommodation tube 33, a chuck 322, a sliding tube 323, and a spring 324.

The chuck 322 serves to grip the core 30 such as the graphite core, and on the side of the pen tip 3a, has an end portion formed as a large-diameter portion greater in diameter than the remaining portion, and is in engagement with the chuck ring 321, which is provided on the forward end of the core accommodation tube 33, to prevent the chuck 322 from moving toward the pen tip 3a.

The sliding tube 323 is provided with a large-diameter part 323a having an outer diameter equal to the outer diameter of the core accommodation tube 33, and a small-diameter part 323b having an outer diameter slightly smaller than the diameter of a hollow section of the core accommodation tube 33. A portion of the small-diameter part 323b of the sliding tube 323 is inserted in the core accommodation tube 33. The chuck 322 is attached to a free end side of the small-diameter part 323b of the sliding tube 323. The small-diameter part 323b of the sliding tube 323 includes another portion that is not inserted in the core accommodation tube 33, and the spring 324 is disposed on this portion. Normally, the sliding tube 323 and chuck 322 are elastically biased by this spring 324 toward the side opposite to the pen tip 3a relative to the core insertion tube 31 and core accommodation tube 33. The large-diameter part 323a of the sliding tube 323 extends to the end portion of the mechanical pencil refill 3, the end portion being on a side opposite to the pen tip 3a, and the writing-pressure transmission member 4 is fitted on an end portion of the large-diameter part 323a of the sliding tube 323.

Therefore, when the pressing protrusion 62 of the pressing member 6 is pressed in a knocking manner by the user and a pressing force is applied toward the pen tip 3a, the pressing arm portions 63a and 63b of the pressing member 6 come into contact with the end portion of the large-diameter part 323a of the sliding tube 323, the end portion being the end portion opposite to the pen tip 3a of the mechanical pencil refill 3, whereby a pressing force that will displace toward the pen tip 3a is applied to the sliding tube 323. By this pressing force, the sliding tube 323 slides toward the pen tip 3a relative to the core insertion tube 31 and core accommodation tube 33, and by the chuck 322, the core 30 such as a graphite core is fed as much as the amount of the sliding.

In this embodiment, the pressing force of the pressing member 6 to the pressing protrusion 62 upon this feeding is transmitted to the end portion of the mechanical pencil refill 3 via the writing-pressure transmission member 4 without application to the writing-pressure detector 5 as described above. Therefore, no pressure is applied to the pressure sensor chip 500 of the writing-pressure detector 5 upon this feeding of the core by the feeding mechanism for the core of the mechanical pencil refill 3.

Therefore, according to the electronic pen 1 of the above-described first embodiment, only writing pressures from the pen tip 3a of the mechanical pencil refill 3 are exerted on the writing-pressure detector 5, and pressures from the side, which is opposite to the pen tip, to the feeding mechanism for the core of the mechanical pencil refill 3 by pressing of the pressing member 6 are not applied to the writing-pressure detector 5. The deterioration of the writing-pressure detector 5 can hence be reduced.

[Circuit Configuration for Position Detection and Writing Pressure Detection in Position Detection Module for Use in Combination with Electronic Pen 1]

Referring to FIG. 4, a description will next be made with regard to an example of a circuit configuration of a position detection module 400, which performs the detection of a position pointed by the electronic pen 1 of the above-described embodiment and the detection of a writing pressure exerted on the writing pen 1, and also with regard to its operation.

The electronic pen 1 is provided with the resonant circuit, in which as illustrated in FIG. 4, the coil 7, the variable capacitance capacitor 5C constituted by the writing-pressure detector 5, and the capacitor 91 arranged on the printed circuit board 9 are connected in parallel with one another.

In the position detection module 400, on the other hand, an X-axis loop coil group 411 and a Y-axis loop coil group 412 are stacked to form a position detection coil 410. The loop coil groups 411 and 412 are made up, for example, from n and m rectangular loop coils, respectively. The individual loop coils which make up each of the loop coil groups 411 and 412 are disposed side by side at equal intervals such that they successively overlap one another.

The position detection module 400 further includes a selection circuit 413 to which the X-axis loop coil group 411 and Y-axis loop coil group 412 are connected. This selection circuit 413 selects the individual loop coils of the two loop coil groups 411 and 412 successively one by one.

The position detection module 400 still further includes an oscillator 421, a current driver 422, a connection switching circuit 423, a reception amplifier 424, a detector 425, a low-pass filter 426, a sample hold circuit 427, an analog to digital (A/D) conversion circuit 428, a synchronous detector 429, another low-pass filter 430, another sample hold circuit 431, another A/D conversion circuit 432, and a processing control circuit 433. The processing control circuit 433 is configured of a microcomputer.

The oscillator 421 generates an alternating current (AC) signal of frequency f0. The oscillator 421 then supplies the generated AC signal to the current driver 422 and synchronous detector 429. The current driver 422 converts the AC signal, which has been supplied from the oscillator 421, into a current and outputs the current to the connection switching circuit 423. Under control from the processing control circuit 433, the connection switching circuit 423 switches a connection destination (a transmission side terminal T or a reception side terminal R) to which each loop coil selected by the selection circuit 413 is to be connected. Of these connection destinations, to the transmission side terminal T and reception side terminal R, the current driver 422 and reception amplifier 424 are connected, respectively.

An induced voltage generated in each loop coil selected by the selection circuit 413 is sent to the reception amplifier 424 via the selection circuit 413 and connection switching circuit 423. The reception amplifier 424 amplifies the induced voltage supplied from the loop coil, and outputs the amplified induced voltage to the detector 425 and synchronous detector 429.

The detector 425 detects the induced voltage generated in the loop coil, namely, a reception signal, and outputs the detected reception signal to the low-pass filter 426. The low-pass filter 426 has a cutoff frequency sufficiently lower than the frequency f0 described above, converts the output signal of the detector 425 into a direct current (DC) signal, and outputs the DC signal to the sample hold circuit 427. The sample hold circuit 427 holds the voltage value of the output signal of the low-pass filter 426 at a predetermined timing, specifically at a predetermined timing within a reception period, and outputs the held voltage value to the A/D conversion circuit 428. The A/D conversion circuit 428 converts the analog output of the sample hold circuit 427 into a digital signal, and outputs the digital signal to the processing control circuit 433.

On the other hand, the synchronous detector 429 synchronously detects the output signal of the reception amplifier 424 according to the AC signal from the oscillator 421, and outputs to the low-pass filter 430 a signal of a level corresponding to a phase difference between the signals. This low-pass filter 430 has a cutoff frequency sufficiently lower than the frequency f0, and converts the output signal of the synchronous detector 429 into a DC signal and outputs the DC signal to the sample hold circuit 431. This sample hold circuit 431 holds the voltage value of the output signal of the low-pass filter 430 at a predetermined timing, and outputs the held voltage value to the A/D conversion circuit 432. The A/D conversion circuit 432 converts the analog output of the sample hold circuit 431 into a digital signal, and outputs the digital signal to the processing control circuit 433.

The processing control circuit 433 controls some of the components of the position detection module 400. Specifically, the processing control circuit 433 controls the selection of each loop coil at the selection circuit 413, the switching of the connection switching circuit 423, and the timings for the sample hold circuits 427 and 431. The processing control circuit 433 controls the transmission of radio waves for a fixed transmission duration (continuous transmission period) from the X-axis loop coil group 411 and Y-axis loop coil group 412 on the basis of input signals from the A/D conversion circuits 428 and 432.

In each of the loop coils of the X-axis loop coil group 411 and Y-axis loop coil group 412, an induced voltage is generated by a radio wave transmitted (returned) from the electronic pen 1. On the basis of the levels of the voltage values of such induced voltages generated in the respective loop coils, the processing control circuit 433 calculates the coordinate values of positions pointed by the electronic pen 1 in the directions of the X-axis and Y-axis. Further, the processing control circuit 433 detects a writing pressure on the basis of a signal corresponding to a phase difference between a transmitted radio wave and its corresponding received radio wave.

In this manner, in the position detection module 400, the position of the electronic pen 1 which has come close thereto is detected by the processing control circuit 433. In addition, by detecting the phase of a received signal, the processing control circuit 433 obtains information on the value of the corresponding writing pressure of the electronic pen 1.

[Second Embodiment]

The electronic pen 1 of the above-described first embodiment has the configuration that a pressing force for feeding the core of the mechanical pencil refill is applied in an axial direction. This second embodiment, on the other hand, has a configuration that a pressing force for feeding the core of the mechanical pencil refill relies upon a pressing force from a direction orthogonal to an axial direction. The electronic pen 1 of the above-described first embodiment is for a position detection module of the electromagnetic induction type. On the other hand, the second embodiment is directed to an electronic pen, which is for a position detection module of a capacitive coupling type, is provided with a signal transmission circuit, and is configured to transmit a transmission signal to the position detection module.

Figure 5A:
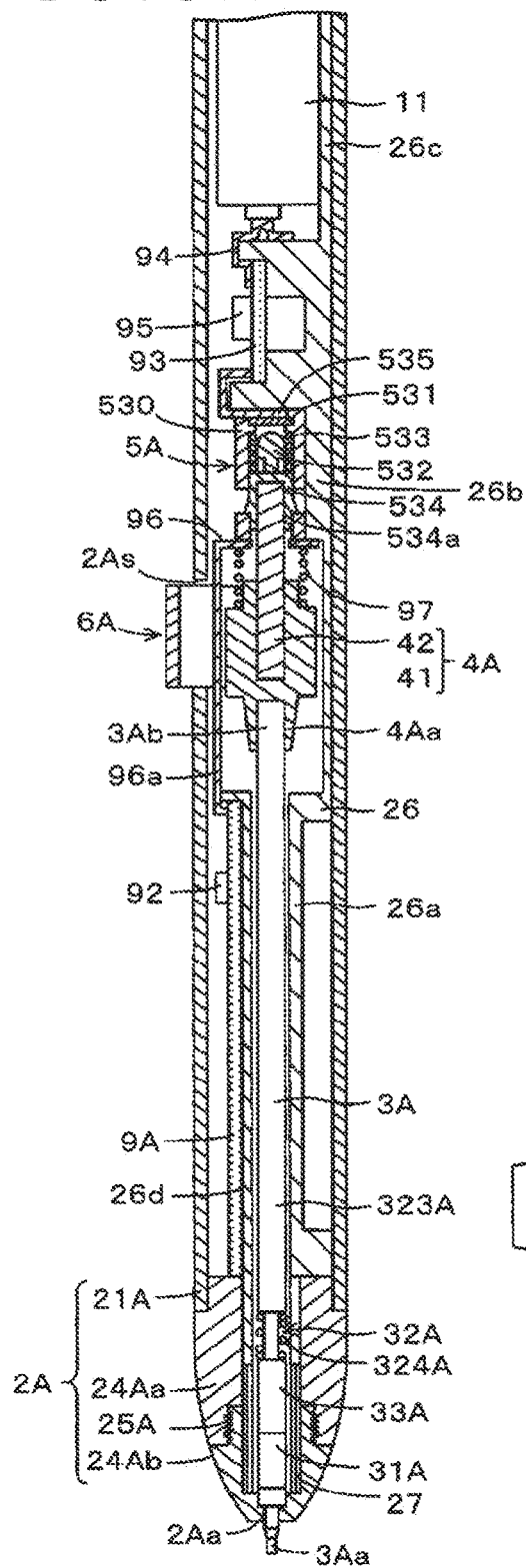
FIGS. 5A, 5B, 5C, and 5D depict views for describing an example of a configuration of a second embodiment of the electronic pen according to the present disclosure.

FIGS. 5A, 5B, 5C, and 5D depict views illustrating an example of a configuration of an electronic pen 1A of the second embodiment. FIG. 5A represents a cross-sectional view of parts of the electronic pen 1A of the second embodiment. In this electronic pen 1A of the second embodiment, as illustrated in FIG. 5A, a mechanical pencil refill 3A as an example of a core member, a writing-pressure transmission member 4A and a writing-pressure detector 5A are disposed in a cylindrical casing 2A such that they align side by side in the direction of an axis of the casing 2A.

Figure 5B:
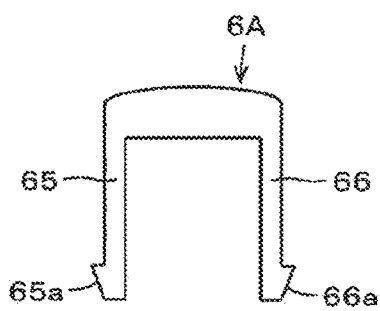
Figure 5C:
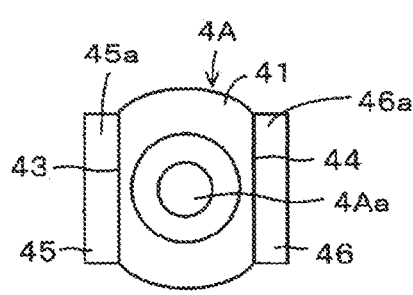
Figure 5D:
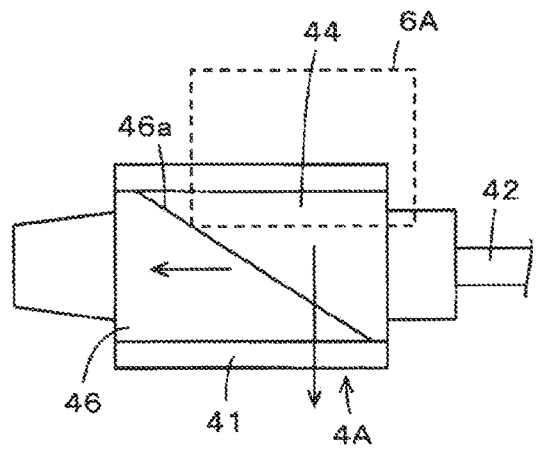

In this second embodiment, as illustrated in FIG. 5A, an opening 2As is provided through a part of a side circumferential wall of the casing 2A, and a pressing member 6A is provided such that through the opening 2As, it presses the mechanical pencil refill 3A toward a pen tip 3Aa via the writing-pressure transmission member 4A. FIGS. 5B, 5C and 5D are views for describing components used to perform feeding of a core of the mechanical pencil refill 3A by a pressing force from a direction orthogonal to the axial direction with the pressing member 6A in the electronic pen 1A of the second embodiment.

The casing 2A is configured of a casing main body section 21A, a pen-tip connection part 24Aa fitted on the casing main body section 21A, and a pen tip sleeve 24Ab threadedly engaged with the pen-tip connection part 24Aa at threaded portions 25A.

In a hollow section of the casing main body section 21A of the casing 2A, a holder 26 is disposed. This holder 26 is provided with a core accommodation part 26a having a hollow part of an inner diameter greater than the diameter of the mechanical pencil refill 3A, a writing-pressure detector holding part 26b with the writing-pressure detector 5A held thereon, and a battery holder part 26c. A battery 11 is accommodated in the battery holder part 26c.

Similar to the inner casing 22 in the first embodiment, the core accommodation part 26a is provided on a circumferential wall thereof with a planar part 26d, on which a printed circuit board 9A is disposed. An oscillation circuit 92 as an example of the signal transmission circuit is provided on the printed circuit board 9A. In a vicinity of the battery holder part 26c of the holder 26, another printed circuit board 93 is provided, and one of terminals of the battery 11 is electrically connected via a metal terminal 94 to a voltage conversion circuit 95 formed on the printed circuit board 93. Although illustration is omitted, the voltage conversion circuit 95 on the printed circuit board 93 is connected to the oscillation circuit 92 on the printed circuit board 9A, and a voltage from the voltage conversion circuit 95 is supplied as a power supply voltage to the oscillation circuit 92.

The mechanical pencil refill 3A is configured similar to the mechanical pencil refill 3 in the above-described first embodiment. This mechanical pencil refill 3A is accommodated in the hollow part of the core accommodation part 26a with its pen tip 3Aa extending outwardly through an opening 2Aa of the pen tip sleeve 24Ab. A core insertion tube 31A, a core accommodation tube 33A, and a sliding tube 323A as a part of a core feeding mechanism 32A are made of an electrically-conductive metal. The sliding tube 323A is in fitting engagement with the core accommodation tube 33A. A spring 324A is also made of an electrically-conductive metal in this embodiment.

In the electronic pen 1A of this second embodiment, a shield member 27 is arranged around the mechanical pencil refill 3A on the side of the pen tip 3Aa. The shield member 27 is configured of two layers, one being an insulating portion on the side of the mechanical pencil refill 3A, and the other a conductor portion around the insulating portion, and is configured that the conductor portion is connected to a ground conductor.

The writing-pressure transmission member 4A is configured of a core fitting part 41 composed of an electrically-conductive member, and a writing-pressure transmitting rod part 42 composed of an insulating member of, for example, a resin and fitted in the core fitting part 41. As illustrated in FIG. 5A, an end portion 3Ab of the mechanical pencil refill 3A (an end portion of the sliding tube 323A) is fitted in a recess 4Aa formed in the core fitting part 41, which is composed of the electrically-conductive member, of the writing-pressure transmission member 4A.

The writing-pressure transmitting rod part 42 of the writing-pressure transmission member 4A is fitted in the writing-pressure detector 5A. In this second embodiment, the writing-pressure detector 5A has, in this example, the configuration of a variable capacitance capacitor, which changes in capacitance according to writing pressure and has, for example, the well-known configuration described in Japanese Patent Laid-open No. 2011-186803.

Described specifically, the writing-pressure detector 5A in this embodiment is configured, as illustrated in FIG. 5A, of a plurality of components, that is, a dielectric 531, an electrically-conductive member 532, an elastic member 533, a holding member 534 and a terminal member 535, all accommodated in a housing member 530 made of an insulating material, for example, a resin. The terminal member 535 constitutes a first electrode of the variable capacitance capacitor configured by the writing-pressure detector 5A. Further, the electrically-conductive member 532 and the elastic member 533 are electrically connected to each other to make up a second electrode of the variable capacitance capacitor.

The terminal member 535 that constitutes the first electrode of the variable capacitance capacitor is electrically connected to the printed circuit board 93, and the elastic member 533 that constitutes the second electrode is also electrically connected to the printed circuit board 93. The printed circuit board 93 and printed circuit board 9A are connected together via, for example, a flexible printed circuit board, the illustration of which is omitted, so that the variable capacitance capacitor is connected as an element for making variable the oscillation frequency of the oscillation circuit 92 of the printed circuit board 9A.

The writing-pressure transmitting rod part 42 of the writing-pressure transmission member 4A is fitted in a recess 534a provided in the holding member 534. It is, however, not necessary for the writing-pressure transmitting rod part 42 to be firmly fitted in the recess 534a of the holding member 534. The writing-pressure transmitting rod part 42 is disposed easily removably from the holding member 534.

To an end face of the housing member 530 of the writing-pressure detector 5A, the end face being on a side of the writing-pressure transmission member 4A, an electrically-conductive metal plate 96 is attached. This metal plate 96 is provided with a through-hole that extends through the writing-pressure transmitting rod part 42 of the writing-pressure transmission member 4A. Between the metal plate 96 and the core fitting part 41 of the writing-pressure transmission member 4A, a spring 97 made of an electrically-conductive material is disposed, and the electrically conductive core fitting part 41 and metal plate 96 are electrically connected together by the electrically-conductive spring 97.

The metal plate 96 is provided with an extension 96a, which is bent at a right angle with respect to the metal plate 96 and extends to as much as the printed circuit board 9A. This extension 96a is connected to the oscillation circuit 92 that makes up the signal transmission circuit of the printed circuit board 9A. Therefore, the signal transmission circuit is configured such that a signal from the oscillation circuit 92 is supplied to the electrically-conductive mechanical pencil refill 3A through the metal plate 96, the spring 97, and the core fitting part 41 of the writing-pressure transmission member 4A and is outputted from the pen tip 3Aa of the mechanical pencil refill 3A.

In the writing-pressure detector 5A, upon exertion of a writing pressure on the mechanical pencil refill 3A, the writing pressure is transmitted to the holding member 534 of the writing-pressure detector 5A via the writing-pressure transmitting rod part 42 of the writing-pressure transmission member 4A, and the holding member 534 moves the electrically-conductive member 532 toward the dielectric 531 according to the exerted writing pressure. Then, the distance and contact area between the electrically-conductive member 532 and the dielectric 531 change according to the exerted writing pressure, and the capacitance of the variable capacitance capacitor constituted by the writing-pressure detector 5A is changed according to the exerted writing pressure.

In this second embodiment, the pressing member 6A is formed in a saddle shape provided with two leg portions 65 and 66 as illustrated in FIGS. 5A and 5B. On free end portions of the leg portions 65 and 66, projections 65a, 66a are formed to prevent the pressing member 6A from coming off from the opening 2As of a main body section of the casing 2A.

As illustrated in FIGS. 5C and 5D, the writing-pressure transmission member 4A is shaped to be engageable with the saddle-shaped pressing member 6A. Described specifically, the core fitting part 41 of the writing-pressure transmission member 4A includes planar portions 43 and 44 on a side circumferential wall thereof such that the leg portions 65 and 66 of the saddle-shaped pressing member 6A can slide astride the core fitting part 41. In this embodiment, the facing distance between the planar portions 43 and 44 is chosen to be slightly smaller than the interval between the two leg portions 65 and 66 of the pressing member 6A.

In this embodiment, on the planar portions 43 and 44 of the core fitting part 41 of the writing-pressure transmission member 4A, inclined portions 45 and 46, which are provided with inclined surfaces 45a and 46a sloping down gradually from the side of the pen tip 3Aa, are formed extending out such that the two leg portions 65 and 66 of the pressing member 6A come, at free ends thereof, into contact with the inclined surfaces 45a and 46a.

When the pressing member 6A is pressed by a user in a direction orthogonal to the axial direction of the casing 2A as indicated by a dashed line in FIG. 5D, the free ends of the two leg portions 65 and 66 of the pressing member 6A come into contact with the inclined surfaces 45a and 46a of the inclined portions 45 and 46 of the core fitting part 41 of the writing-pressure transmission member 4A so that the core fitting part 41 moves toward the pen tip 3Aa against the elastic force of the spring 324A of the mechanical pencil refill 3A. Consequently, the sliding tube 323A of the mechanical pencil refill 3A acts such that a chuck 322A (illustration is omitted) is caused to slide against the elastic force of the spring 324A to feed the graphite core.

When the pressing to the pressing member 6A in the direction orthogonal to the axial direction of the casing 2A is stopped, the sliding tube 323A of the mechanical pencil refill 3A moves to a side opposite to the pen tip 3Aa by the elastic force of the spring 324A, whereby the core fitting part 41 of the writing-pressure transmission member 4A moves to the side opposite to the pen tip 3Aa, lifts the pressing member 6A upwardly, and returns into the initial state. In the manner as described above, the user can feed the core such as the graphite core from the mechanical pencil refill 3A by pressing the pressing member 6A in a knocking manner in the direction orthogonal to the axial direction of the casing 2A. Here, the core fitting part 41 of the writing-pressure transmission member 4A moves merely to return to its initial position after moving to the side of the pen tip 3Aa, so that the elastic force of the spring 324A is not transmitted as a writing pressure to the writing-pressure detector 5A.

Therefore, according to the electronic pen 1A of the above-described second embodiment, only writing pressures from the pen tip 3a of the mechanical pencil refill 3 are exerted on the writing-pressure detector 5A, and pressures to the feeding mechanism for the core of the mechanical pencil refill 3A by pressing of the pressing member 6A are not applied to the writing-pressure detector 5A. The deterioration of the writing-pressure detector 5A can hence be reduced.

[Example of Circuit Configuration of Electronic Pen 1A and Circuit Configuration for Position Detection and Writing Pressure Detection in Position Detection Module]

Figure 6:
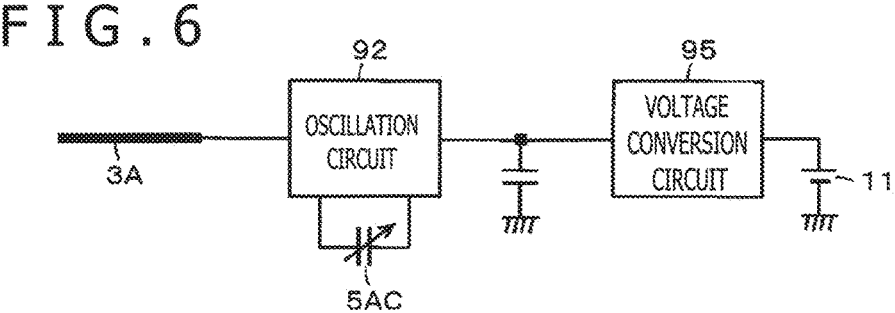
FIG. 6 is a view for describing an example of an electrical configuration of the second embodiment of the electronic pen according to the present disclosure.

FIG. 6 illustrates an example of a circuit configuration of the electronic pen 1A. As described above, the battery 11 is connected to the voltage conversion circuit 95. The voltage conversion circuit 95 converts the voltage of the battery 11 to a predetermined voltage, and supplies it as a power supply for the oscillation circuit 92. This voltage conversion circuit 95 can be of a step-down type that its output voltage becomes lower than the voltage of the battery 11, or can be of a step-up type that its output voltage becomes higher than the voltage of the battery 11. As a further alternative, the voltage conversion circuit 95 can also be of a step-up/step-down type that it operates as a step-down circuit when the voltage of the battery 11 is higher than the predetermined voltage but operates as a step-up circuit when the voltage of the battery 11 is lower than the predetermined voltage.

A variable capacitance capacitor 5AC constituted by the writing-pressure detector 5A is connected to the oscillation circuit 92. The oscillation circuit 92 generates a signal the frequency of which changes according to the capacitance of the variable capacitance capacitor 5AC in the writing-pressure detector 5A, and supplies the generated signal to the mechanical pencil refill 3A. The signal from the oscillation circuit 92 is radiated as an electric field on the basis of the signal from the pen tip 3Aa of the mechanical pencil refill 3A. The oscillation circuit 92 is configured, for example, of an inductance-capacitance (LC) oscillation circuit that uses oscillation by a coil and a capacitor. A tablet that detects a coordinate position of a capacitive stylus pen as an example of the electronic pen 1A of this embodiment can determine, from the frequency of the signal, the writing pressure exerted on the pen tip 3Aa of the mechanical pencil refill 3A.

Figure 7:
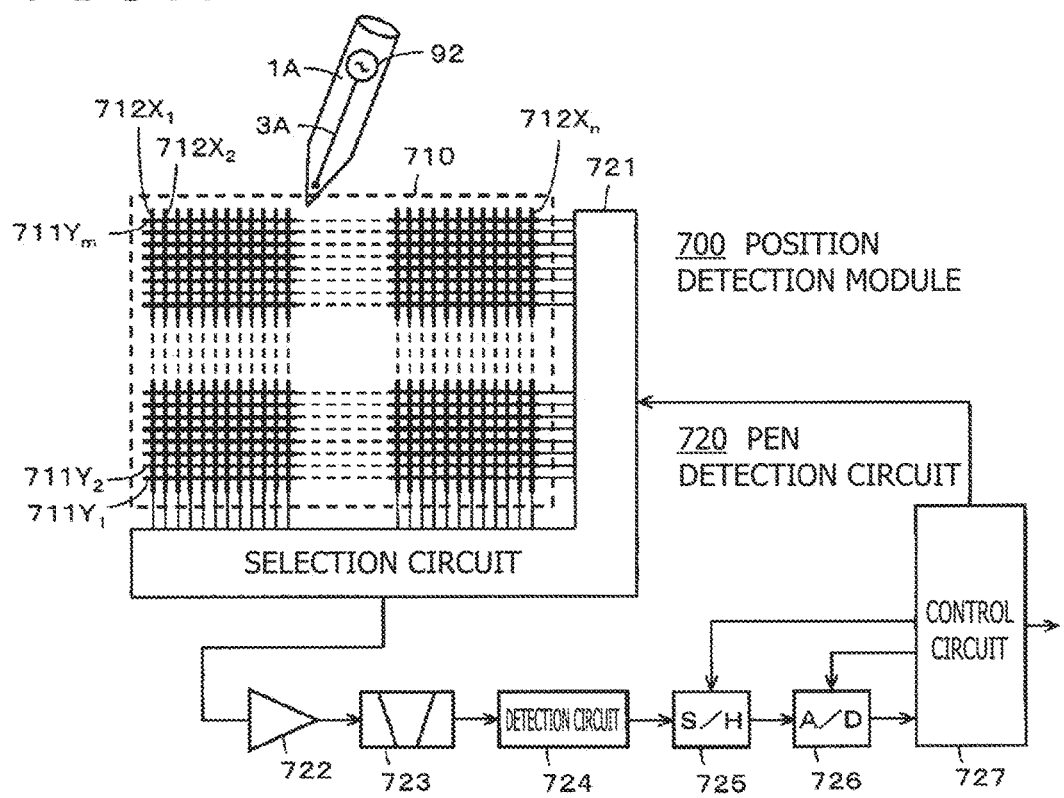
FIG. 7 is a view for describing an example of a circuit configuration of a position detection module for use in combination with the second embodiment of the electronic pen according to the present disclosure.

FIG. 7 is a block diagram for describing a position detection module 700, which receives a signal from the electronic pen 1A of the second embodiment, detects a position on a sensor, and also detects a writing pressure.

As illustrated in FIG. 7, the position detection module 700 in this embodiment includes a sensor 710 and a pen detection circuit 720 connected to the sensor 710. In this example, the sensor 710 includes a first conductor group 711, an insulating layer (illustration is omitted) and a second conductor group 712 formed by stacking them in this order from the side of the lower layer, although its cross-sectional view is omitted. In the first conductor group 711, a plurality of first conductors $711Y_1, 711Y_2, \ldots, 711Y_m$ (m is an integer of 1 or greater), which extend, for example, in a lateral direction (in the direction of an X-axis), are disposed at predetermined intervals in parallel with each other in the direction of a Y-axis.

In the second conductor group 712, on the other hand, a plurality of second conductors $712X_1, 712X_2, \ldots, 712X_n$ (n is an integer of 1 or greater), which extend in a direction intersecting the extending direction of the first conductors $711Y_1, 711Y_2, \ldots, 711Y_m$, in this example, in a longitudinal direction (in the direction of the Y-axis) intersecting the extending direction of the first conductors at right angles, are disposed at predetermined intervals in parallel with each other in the direction of the X-axis.

As described above, the sensor 710 in the position detection module 700 has a configuration that a position pointed by the electronic pen 1A is detected using a sensor pattern formed by making the first conductor group 711 and the second conductor group 712 intersect each other.

It is to be noted that concerning the first conductors $711Y_1, 711Y_2, \ldots, 711Y_m$, these conductors will be called "the first conductors 711Y" in the subsequent description when it is unnecessary to distinguish the individual conductors. Similarly it is to be noted that concerning the second conductors $712X_1, 712X_2, \ldots, 712X_n$, these conductors will be called "the second conductors 712X" when it is unnecessary to distinguish the individual conductors.

The pen detection circuit 720 includes a selection circuit 721 as an input/output interface with the sensor 710, an amplification circuit 722, a band-pass filter 723, a detection circuit 724, a sample-and-hold circuit 725, an A/D circuit 726, and a control circuit 727.

The selection circuit 721 selects one conductor 711Y or 712X out of the first conductor group 711 and second conductor group 712 on the basis of a control signal from the control circuit 727. The conductor selected by the selection circuit 721 is connected to the amplification circuit 722, so that a signal from the electronic pen 1A is detected by the selected conductor and is amplified by the amplification circuit 722. An output of this amplification circuit 722 is supplied to the band-pass filter 723, where only the frequency component of the signal transmitted from the electronic pen 1A is extracted.

An output signal of the band-pass filter 723 is detected by the detection circuit 724. An output signal of the detection circuit 724 is supplied to the sample-and-hold circuit 725, is sampled and held at a predetermined timing by a sampling signal from the control circuit 727, and is then converted into a digital value by the A/D conversion circuit 726. The digital data from the A/D conversion circuit 726 is read and processed by the control circuit 727.

The control circuit 727 operates to output control signals to the sample-and-hold circuit 725, A/D conversion circuit 726 and selection circuit 721, respectively, by a program stored in an internal read-only memory (ROM). Subsequently, the control circuit 727 calculates the coordinates of a position, which has been pointed on the sensor 710 by the electronic pen 1A, on the basis of the digital data from the A/D conversion circuit 726, and also determines the writing pressure detected at the writing-pressure detector 5A.

Described specifically, the control circuit 727 first supplies, to the selection circuit 721, selection signals for successively selecting, for example, the second conductors $712X_1$ to $712X_n$, and upon selection of the respective second conductors $712X_1$ to $712X_n$, reads data, which are outputted from the A/D conversion circuits 726, as signal levels. If all the signal levels of the second conductors $712X_1$ to $712X_n$ have not reached a predetermined value, the control circuit 727 determines that the electronic pen 1A does not exist on the sensor 710, and repeats the control that successively selects the second conductors $712X_1$ to $712X_n$.

When signals of a level of a predetermined value or higher are detected from some of the second conductors $712X_1$ to $712X_n$, the control circuit 727 stores the number of the second conductor 712X, from which the signal of a highest level has been detected, and the numbers of plural ones of the remaining second conductors 712X, the plural remaining second conductors X being located around the first-mentioned second conductor 712X. The control circuit 727 then controls the selection circuit 721 to successively select the first conductors $711Y_1$ to $711Y_m$, whereby signal levels from the A/D conversion circuit 726 are read. At this time, the control circuit 727 stores the number of the first conductor 711Y, from which a highest signal level has been detected, and the numbers of plural ones of the remaining first conductors 711Y, the plural remaining first conductors 711Y being located around the first-mentioned first conductor 711Y.

The control circuit 727 then determines the position on the sensor 710, which was pointed to by the electronic pen 1A, from the number of the second conductor 712X and the number of the first conductor 711Y, from both of which the highest signal levels have been detected, and the numbers of the plural remaining second conductors 712X and first conductors 711Y around the second and first conductors 712X and 711Y of the highest signal levels.

The control circuit 727 also detects the frequencies of the signals from the A/D conversion circuit 726, and from the detected frequencies, determines the value of the writing pressure detected at the writing-pressure detector 5A. Described specifically, as described above, the oscillation frequency of the oscillation circuit 92 of the electronic pen 1A has a value corresponding to the capacitance of the variable capacitance capacitor SAC constituted by the writing-pressure detector 5A. The control circuit 727 is provided, for example, with the information of a correspondence table of oscillation frequencies of the oscillation circuit 92 of the electronic pen 1A and writing pressure values, and determines the value of each writing pressure from the information of the correspondence table.

In the second embodiment described above, the electronic pen 1A is configured to convert each writing pressure, which has been detected at the writing pressure detector 5A, into a frequency, and then to feed it to the mechanical pencil refill 3A. However, the signal attribute set to correspond to writing pressure is not limited to frequency, and writing pressure may be set to correspond to signal phase, the number of signal interruptions, or the like.

[Other Embodiments and Modifications]

In the electronic pen of each embodiment described above, the mechanical pencil refill provided with a core feeding mechanism is used as a core member. However, the core member is not limited to such a mechanical pencil refill, and can be a ballpoint pen core that its pen tip is fed out, for example, in a knocking manner.

In each embodiment described above, the writing-pressure detector is configured to use the variable capacitance capacitor which changes in capacitance according to writing pressure. Obviously, the writing-pressure detector can be one changeable in inductance value or resistance value insofar as it is a variable element that changes the oscillation frequency of the oscillation circuit.

Further, in the second embodiment described above, the signal transmission circuit is configured to use each oscillation signal itself of the oscillation circuit as a signal to be outputted through the core member. However, the signal transmission circuit may be configured to generate, instead of the oscillation signal itself of the oscillation circuit, a signal obtained by applying desired processing to the oscillation signal, for example, by modulating the oscillation signal.

Furthermore, in each embodiment described above, the information of each writing pressure as detected at the writing-pressure detector is configured to be transmitted as a change in oscillation frequency or as a change in the frequency of oscillation signal to the position detection module. However, the transmission method of the information of each writing pressure from the electronic pen to the position detection module is not limited to such a transmission method. For example, the electronic pen of the present disclosure and the position detection module may be both provided with radio communication circuits, for example, of the Bluetooth (registered trademark) Standards, and the information of each writing pressure may be transmitted through the radio communication circuits.

DESCRIPTION OF REFERENCE SYMBOLS 1, 1A . . . Electronic pen, 2, 2A . . . Casing, 3, 3A . . . Mechanical pencil refill, 4, 4A . . . Writing-pressure transmission member, 5, 5A . . . Writing-pressure detector, 6, 6A . . . Pressing member, 32 . . . Core feeding mechanism

The invention claimed is:

1. An electronic pen that indicates a position to a position detection module by transmitting and receiving signals with the position detection module, comprising:
   a cylindrical casing;
   a core member accommodated in an interior portion of the casing, the core member including a first end and a second end serving as a pen tip, the first end of the core member being opposite the second end of the core member serving as the pen tip;
   a writing-pressure detector disposed in the interior portion of the casing on the first end of the core member;
   a writing-pressure transmission member disposed in the interior portion of the casing, between the first end of the core member and the writing-pressure detector; and
   a pressing member which, in operation, applies, based on an operation by a user, a force to the core member from the first end of the core member to the second end of the core member serving as the pen tip,
   wherein the writing-pressure transmission member includes a protrusion which, in operation, transmits a writing pressure to the writing-pressure detector, the writing pressure being exerted on the core member fitted in a fit-in portion included in the writing-pressure transmission member,
   wherein the pressing member, in operation, applies the force to the core member via the writing-pressure transmission member without applying an axial force to the writing-pressure detector, and
   wherein the pressing member is provided on a first side of the writing-pressure detector, the first side of the writing-pressure detector being opposite a second side of the writing-pressure detector where the writing-pressure transmission member is fitted, and the pressing member includes an extension, the extension extending along an outer wall of the writing-pressure detector and being in engagement with a first end of the writing-pressure transmission member, the first end of the writing-pressure transmission member being opposite a second end of the writing-pressure transmission member on which the fit-in portion is provided.

2. The electronic pen according to claim 1, wherein
the core member is a mechanical pencil having a core feeding mechanism, and
the core feeding mechanism of the mechanical pencil is driven by the force applied to the pressing member.

3. The electronic pen according to claim 1, further comprising:
a coil wound on a magnetic core, which is disposed in a vicinity of an opening of the casing, the opening being adjacent to the pen tip, and having a through-hole with the core member extending therethrough; and
a capacitor connected to the coil, the capacitor and the coil forming a resonant circuit.

4. The electronic pen according to claim 3, wherein the writing-pressure detector is an electric element that is part of the resonant circuit, and the electric element, in operation, changes a resonant frequency of the resonant circuit according to the writing pressure exerted on the core member.

5. The electronic pen according to claim 1, wherein:
the core member has electrical conductivity, and a signal transmission circuit is included in the casing, and
the signal transmission circuit outputs a signal through the core member.

6. The electronic pen according to claim 5, wherein the writing-pressure detector is an electric element that is part of an oscillation circuit included in the signal transmission circuit, and the electric element, in operation, changes an oscillation frequency of the oscillation circuit according to the writing pressure exerted on the core member.

7. The electronic pen according to claim 1, wherein the writing-pressure detector includes a micro electro mechanical system.

8. The electronic pen according to claim 1, wherein the writing-pressure detector includes a first conductor and a second conductor that are disposed opposite to each other with a dielectric layer interposed therebetween in a direction of an axis of the casing and the first conductor moves according to the writing pressure transmitted via the writing-pressure transmission member and changes a distance between the first conductor and the dielectric layer and a contact area of the first conductor with the dielectric layer, and a first electrode and a second electrode lead out from the first conductor and the second conductor.

9. An electronic pen that indicates a position to a position detection module by transmitting and receiving signals with the position detection module, comprising:
a cylindrical casing;
a core member accommodated in an interior portion of the casing, the core member including a first end and a second end serving as a pen tip, the first end of the core member being opposite the second end of the core member serving as the pen tip;
a writing-pressure detector disposed in the interior portion of the casing on the first end of the core member;
a writing-pressure transmission member disposed in the interior portion of the casing, between the first end of the core member and the writing-pressure detector; and
a pressing member which, in operation, applies, based on an operation by a user, a force to the core member from the first end of the core member to the second end of the core member serving as the pen tip,
wherein the writing-pressure transmission member includes a protrusion which, in operation, transmits a writing pressure to the writing-pressure detector, the writing pressure being exerted on the core member fitted in a fit-in portion included in the writing-pressure transmission member,
wherein the pressing member, in operation, applies the force to the core member via the writing-pressure transmission member without applying an axial force to the writing-pressure detector, and
wherein the pressing member is disposed through a side circumferential wall of the casing and is moveable in a direction orthogonal to an axial direction of the casing, and, when actuated, engages the writing-pressure transmission member and applies, to the writing-pressure transmission member, the force applied to the pressing member, which causes a core of the core member to move toward a pen tip side of the casing.

10. A method comprising:
providing an electronic pen that indicates a position to a position detection module, wherein the electronic pen includes a cylindrical casing, a core member accommodated in an interior portion of the casing, the core member including a first end and a second end serving as a pen tip, the first end of the core member being opposite the second end of the core member serving as the pen tip, a writing-pressure detector disposed in the interior portion of the casing and coupled to the core member, a writing-pressure transmission member disposed in the interior portion of the casing between the core member and the writing-pressure detector, and a pressing member that is operable by a user, wherein the pressing member is provided on a first side of the writing-pressure detector, the first side of the writing-pressure detector being opposite a second side of the writing-pressure detector where the writing-pressure transmission member is fitted, and the pressing member includes an extension, the extension extending along an outer wall of the writing-pressure detector and being in engagement with a first end of the writing-pressure transmission member, the first end of the writing-pressure transmission member being opposite a second end of the writing-pressure transmission member on which the fit-in portion is provided;
transmitting a writing pressure that has been exerted on a pen tip portion of the core member, from a protrusion of the writing-pressure transmission member to the writing-pressure detectors; and
applying a force applied to the pressing member to the core member via the writing-pressure transmission member without applying an axial force to the writing-pressure detector.

11. The method according to claim 10, wherein the core member is a mechanical pencil having a core feeding mechanism, and the method further comprises:
driving the core feeding mechanism of the mechanical pencil using the force transmitted from the pressing member to the writing-pressure transmission member.

12. The method according to claim 10, wherein the electronic pen further includes:
a coil wound on a magnetic core, which is disposed in a vicinity of an opening of the casing, the opening being adjacent to the pen tip, and having a through-hole with the core member extending therethrough; and
a capacitor connected to the coil, the capacitor and the coil forming a resonant circuit.

13. The method according to claim 12, wherein the writing-pressure detector is an electric element that is part of the resonant circuit, and the method further comprises:
changing a resonant frequency of the resonant circuit according to the writing pressure exerted on the core member.

14. The method according to claim 10, wherein the core member has electrical conductivity, and a signal transmission circuit is included in the casing, and the method further comprises:

outputting a signal from the signal transmission circuit through the core member.

15. The method according to claim 14, wherein the writing-pressure detector is an electric element that is part of an oscillation circuit included in the signal transmission circuit, and the method further comprises:

changing an oscillation frequency of the oscillation circuit according to the writing pressure exerted on the core member.

16. The method according to claim 10, wherein the writing-pressure detector includes a micro electro mechanical system.

17. The method according to claim 10, wherein the writing-pressure detector includes a first conductor and a second conductor with a dielectric layer interposed therebetween, and the method further comprises:

moving the first conductor according to the writing pressure transmitted via the writing-pressure transmission member;

changing a distance between the first conductor and the dielectric layer; and changing a contact area of the first conductor with the dielectric layer.

18. A method comprising:

providing an electronic pen that indicates a position to a position detection module, wherein the electronic pen includes a cylindrical casing, a core member accommodated in an interior portion of the casing, the core member including a first end and a second end serving as a pen tip, the first end of the core member being opposite the second end of the core member serving as the pen tip, a writing-pressure detector disposed in the interior portion of the casing and coupled to the core member, a writing-pressure transmission member disposed in the interior portion of the casing between the core member and the writing-pressure detector, and a pressing member that is operable by a use, wherein the pressing member is disposed through a side circumferential wall of the casing and is movable in a direction orthogonal to an axial direction of the casing;

engaging the pressing member with the writing-pressure transmission member;

transmitting a force from the pressing member to the writing-pressure transmission member; and moving a core of the core member toward a pen tip side of the casing in response to the transmitting of the force from the pressing member to the writing-pressure transmission member.

* * * * *